United States Patent
Huang et al.

(10) Patent No.: US 11,137,667 B2
(45) Date of Patent: Oct. 5, 2021

(54) THREE-AXIS GIMBAL AND THREE-AXIS GIMBAL PHOTOGRAPHING APPARATUS

(71) Applicant: SZ DJI OSMO TECHNOLOGY CO., LTD., Shenzhen (CN)

(72) Inventors: Yongjie Huang, Shenzhen (CN); Shanguang Guo, Shenzhen (CN); Xifeng Zhao, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 35 days.

(21) Appl. No.: 16/378,069

(22) Filed: Apr. 8, 2019

(65) Prior Publication Data

US 2019/0235358 A1    Aug. 1, 2019

Related U.S. Application Data

(63) Continuation of application No. PCT/CN2016/101623, filed on Oct. 10, 2016.

(51) Int. Cl.
*G03B 17/56* (2006.01)
*F16M 11/12* (2006.01)
(Continued)

(52) U.S. Cl.
CPC ......... *G03B 17/561* (2013.01); *F16M 11/105* (2013.01); *F16M 11/123* (2013.01);
(Continued)

(58) Field of Classification Search
CPC ...... G03B 17/00; G03B 17/56; G03B 17/561; G03B 15/00; G03B 17/563; G03B 17/566;
(Continued)

(56) References Cited

U.S. PATENT DOCUMENTS 4,979,709 A    12/1990 Ishikawa
5,517,204 A *  5/1996 Murakoshi ............... H01Q 1/18
                                                     248/183.1
(Continued)

FOREIGN PATENT DOCUMENTS

CN    201380965 Y    1/2010
CN    202295294 U    7/2012
(Continued)

OTHER PUBLICATIONS

World Intellectual Property Organization (WIPO) International Search Report for PCT/CN2016/101623 dated Jul. 10, 2017 6 Pages.

*Primary Examiner* — Clayton E. LaBalle
*Assistant Examiner* — Fang-Chi Chang
(74) *Attorney, Agent, or Firm* — Anova Law Group, PLLC

(57) ABSTRACT

A three-axis gimbal and three-axis gimbal photographing apparatus are provided. The first electromechanical coupling apparatus of the three-axis gimbal includes a first hollow motor shaft. The first hollow motor shaft has a first accommodation cavity. A second electromechanical coupling apparatus includes a second hollow motor shaft. The second hollow motor shaft has a second accommodation cavity. A pitch axis arm includes a pitch axis accommodation cavity, A roll axis component includes a first conductive wire configured in the first accommodation cavity and the roll axis arm accommodation cavity. A pitch axis component includes a second conductive wire configured in the second accommodation cavity and the pitch axis arm accommodation cavity. The first conductive wire is connected to the second conductive wire.

19 Claims, 4 Drawing Sheets

(51) Int. Cl.
*F16M 11/18* (2006.01)
*G03B 15/00* (2021.01)
*F16M 11/10* (2006.01)
*F16M 11/20* (2006.01)

(52) U.S. Cl.
CPC ......... *F16M 11/18* (2013.01); *F16M 11/2064* (2013.01); *G03B 15/006* (2013.01); *F16M 2200/041* (2013.01)

(58) Field of Classification Search
CPC ...... G03B 15/006; F16M 11/06; F16M 11/08; F16M 11/10; F16M 11/105; F16M 11/12; F16M 11/121; F16M 11/123; F16M 11/125; F16M 11/126; F16M 11/128; F16M 11/18; F16M 11/2028; F16M 11/2042; F16M 11/205; F16M 11/2057; F16M 11/2064; F16M 11/2071; F16M 2200/041
USPC ........................................... 396/427; 348/144
See application file for complete search history.

(56) References Cited

U.S. PATENT DOCUMENTS

| | | |
|---|---|---|
| 2014/0194743 A1 | 7/2014 | Havel et al. |
| 2015/0250451 A1 | 9/2015 | Fearnot et al. |
| 2016/0290556 A1 | 10/2016 | Choi et al. |
| 2016/0291445 A1* | 10/2016 | Fisher, Sr. ........... G03B 15/006 |
| 2017/0146892 A1 | 5/2017 | Wei |
| 2017/0227834 A1 | 8/2017 | Zhao et al. |
| 2017/0241589 A1 | 8/2017 | Wang et al. |
| 2017/0307136 A1* | 10/2017 | Wei ........................ F16M 13/04 |
| 2018/0337579 A1 | 11/2018 | Chen et al. |
| 2019/0162358 A1 | 5/2019 | Wang et al. |
| 2019/0215429 A1* | 7/2019 | Appel .................... F16M 11/10 |

FOREIGN PATENT DOCUMENTS

| | | |
|---|---|---|
| CN | 103277640 A | 9/2013 |
| CN | 203927268 U | 11/2014 |
| CN | 105388684 A | 3/2016 |
| CN | 105697947 A | 6/2016 |
| CN | 105736925 A | 7/2016 |
| CN | 205424318 U | 8/2016 |
| CN | 205560201 U | 9/2016 |
| CN | 206159771 U | 5/2017 |
| JP | 2002199648 A | 7/2002 |
| JP | 2006329215 A | 12/2006 |
| JP | 2008072485 A | 3/2008 |
| JP | 6560260 B2 | 7/2014 |
| WO | 2015149370 A1 | 10/2015 |

* cited by examiner

THREE-AXIS GIMBAL AND THREE-AXIS GIMBAL PHOTOGRAPHING APPARATUS

CROSS-REFERENCE TO RELATED APPLICATION

This application is a continuation application of International Application No. PCT/CN2016/101623, filed on Oct. 10, 2016, the entire contents of which are incorporated herein by reference.

TECHNICAL FIELD

The present disclosure relates to the field of gimbal and, more particularly, to a three-axis gimbal and a photographing apparatus including a three-axis gimbal.

BACKGROUND

In related technologies, a connection bus of a gimbal generally may be in a form of a flexible printed circuit board and winds around an outer surface of motor shaft of an electromechanical coupling apparatus. Correspondingly, when a rotating body of the electromechanical coupling apparatus rotates in one direction, one end portion of the flexible circuit board rotates together with the rotation of the rotating body, and a connecting portion of the flexible circuit board relaxes over the rotating body. When the rotating body rotates in the other direction, the flexible circuit board is wound relatively tight around the rotating body. In another approach, a connection bus of a gimbal is arranged to be connected directly from an outer part to a control part of a motor without passing through the motor. Further, the flexible printed circuit board is exposed outside a support arm of the gimbal, and is coupled to a device such as a camera.

SUMMARY

The present disclosure provides a three-axis gimbal and three-axis gimbal photographing apparatus.

According to a first aspect of the present disclosure, a three-axis gimbal for mounting a photographing component is provided, comprising: a roll axis component and a pitch axis component, wherein: roll axis component includes a roll axis arm and a first electromechanical coupling apparatus arranged at one end of the roll axis arm; the pitch axis component includes a pitch axis arm and a second electromechanical coupling apparatus arranged at one end of the pitch axis arm; the first electromechanical coupling apparatus includes a first hollow motor shaft; a first accommodation cavity is arranged in the first hollow motor shaft; a roll axis arm accommodation cavity is arranged in the roll axis arm; the first accommodation cavity is connected to the roll axis arm accommodation cavity; the second electromechanical coupling apparatus includes a second hollow motor shaft; a second accommodation cavity is arranged in the second hollow motor shaft; a pitch axis arm accommodation cavity is arranged in the pitch axis arm; the second accommodation cavity is connected to the pitch axis arm accommodation cavity; the roll axis component further includes a first conductive wire in the first accommodation cavity and the roll axis arm accommodation cavity; the pitch axis component further includes a second conductive wire in the second accommodation cavity and the pitch axis arm accommodation cavity; and the first conductive wire is connected to the second conductive wire.

According to a second aspect of the present disclosure, a three-axis gimbal is provided having the foregoing described features, wherein the first conductive wire and/or the second conductive wire are coaxial wires.

According to a second aspect of the present disclosure, a three-axis gimbal is provided having the foregoing described features, wherein the first conductive wire and/or the second conductive wire are coaxial wires.

According to a third aspect of the present disclosure, a three-axis gimbal photographing apparatus is provided, comprising: a fuselage; a photographing component; and the three-axis gimbal between the fuselage and the photographing component. The foregoing description of the three-axis gimbal also applies to the three-axis gimbal of the three-axis gimbal photographing apparatus.

The technical solutions provided by the embodiments of the present disclosure has the following beneficial results: the conductive wires of the three-axis gimbal are arranged in the electromechanical coupling apparatus and pass through axes, and are also arranged in the support arm of the gimbal. Accordingly, issues such as wire winding or wire scraping may be suppressed. Further, the structure can be relatively compact and reliable.

DETAILED DESCRIPTION OF THE EMBODIMENTS

Figure 1:
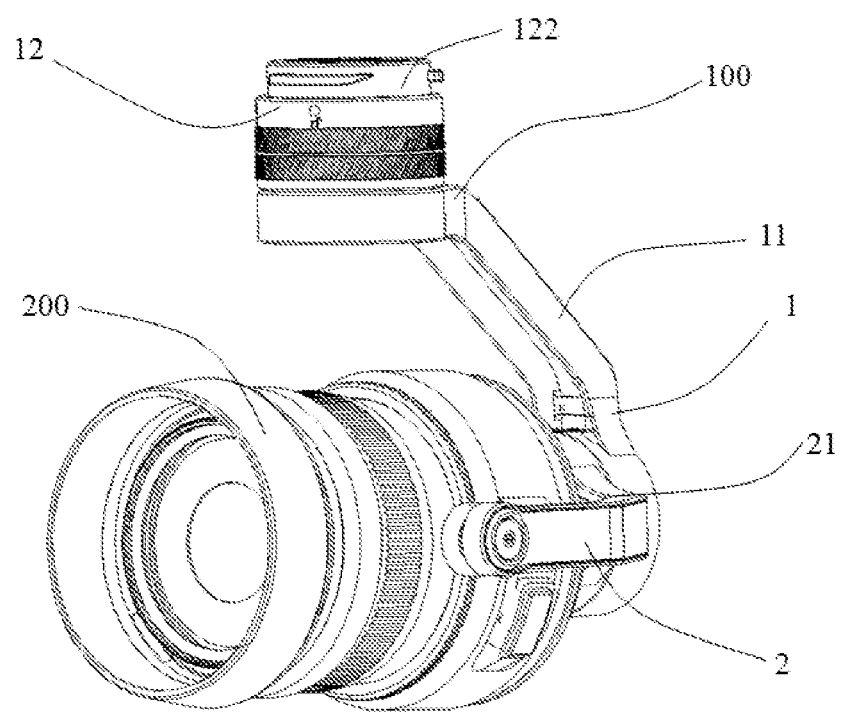
FIG. 1 is an axonometric view of an exemplary three-axis gimbal according to disclosed embodiments of the present disclosure.

Technical solutions of the present disclosure will be described with reference to the drawings. The following description refers to the same or similar elements in the different drawings, unless otherwise indicated. The embodiments described in the following exemplary embodiments do not represent all embodiments consistent with the present disclosure. Instead, they are merely examples of devices and methods consistent with aspects of the present application as detailed in the appended claims.

Some embodiments of the present disclosure are described in details below with reference to the accompanying drawings. The features of the embodiments and examples described below may be combined as long as they are not contradictory to each other.

In related technologies, a flexible printed circuit board may wound on a surface of motor shaft, and a relatively large winding space may be needed, increasing a thickness of motor. Further, the flexible printed circuit board can only transmit signals at low transmission rates and cannot transmit signals with high transmission rates due to a process of the flexible printed circuit board.

Alternatively, a connection bus of a gimbal may be arranged to be connected directly from an outer part to a control part of a motor without passing through the motor. In this approach, the number of connection buses and rotation angles of the gimbal are limited, which tend to cause issues such as winding or scraping of connection buses. Accordingly, a service life of the gimbal may be reduced. In particular, on a multi-axis gimbal, the above-described issues may be relatively easy to occur.

The present disclosure provides a three-axis gimbal and three-axis gimbal photographing apparatus. The conductive wires of the three-axis gimbal are arranged in the electromechanical coupling apparatus and pass through axes, and are also arranged in the support arm of the gimbal. Accordingly, issues such as wire winding or wire scraping may be suppressed. Further, the structure can be relatively compact and reliable.

Referring to FIGS. 1 to 4, the present disclosure provides a three-axis gimbal (TAG) photographing apparatus. The TAG photographing apparatus includes a fuselage (not shown), a photographing device component 200, also referred to as "photographing component," and a three-axis gimbal 100. The three-axis gimbal 100 is coupled to the fuselage and the photographing component 200, and is between the fuselage and the photographing component 200.

The three-axis gimbal 100 is used to carry the photographing component 200. The three-axis gimbal 100 includes a roll axis component 1 and a pitch axis component 2. The roll axis component 1 includes a roll axis arm 11 and a first electromechanical coupling apparatus 12 arranged at one end of the roll axis arm 11. The first electromechanical coupling apparatus 12 is arranged at an upper end of the roll axis arm 11. The pitch axis component 2 includes a pitch axis arm 21 and a second electromechanical coupling apparatus 22 arranged at one end of the pitch axis arm 21. The second electromechanical coupling apparatus 22 is arranged at an end portion of the pitch axis arm 21.

Figure 3:
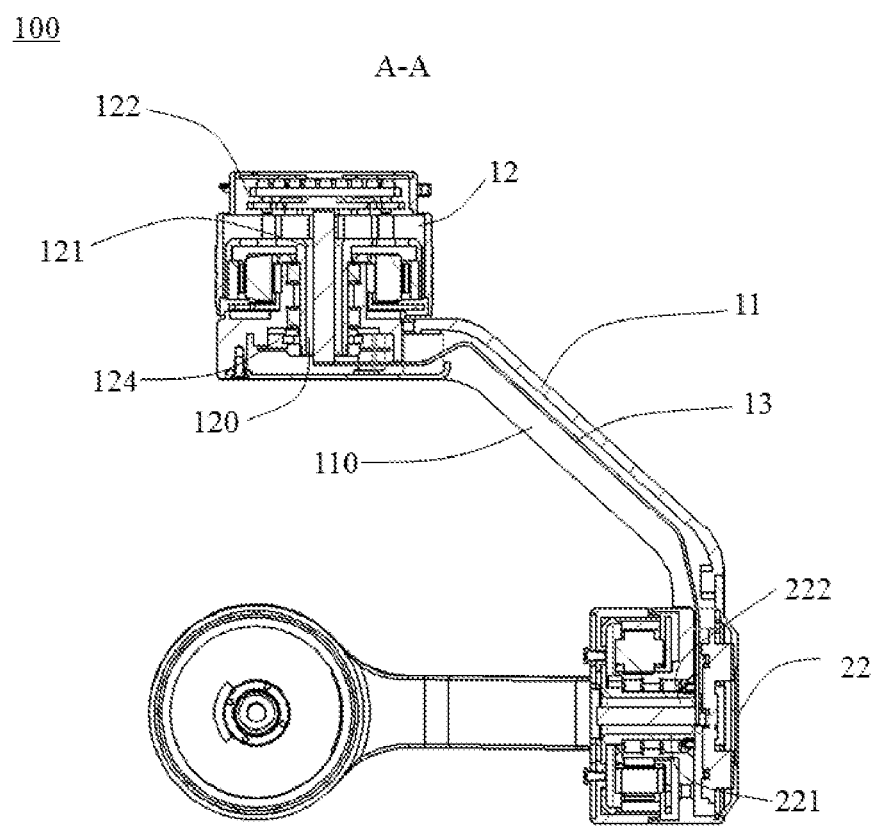
FIG. 3 is an A-A arrow view of the exemplary three-axis gimbal in FIG. 2 according to disclosed embodiments of the present disclosure.
Figure 4:
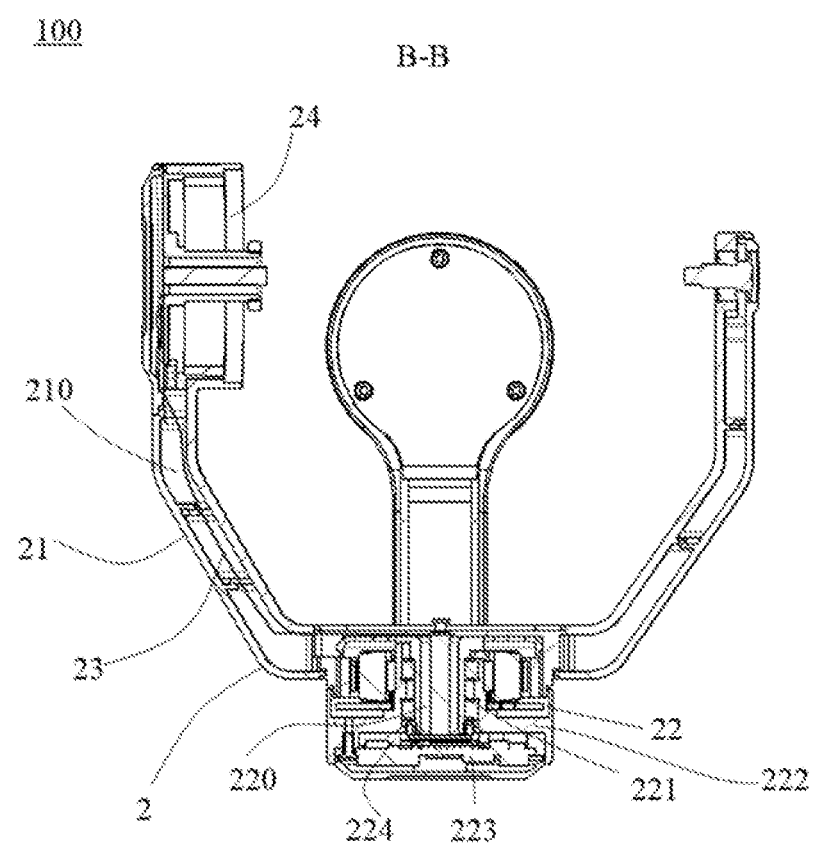
FIG. 4 is a B-B arrow view of the exemplary three-axis gimbal in FIG. 2 according to disclosed embodiments of the present disclosure.

As shown in FIG. 3, the first electromechanical coupling apparatus 12 includes a first hollow motor shaft 121. The first hollow motor shaft 121 includes a first accommodation cavity 120. The roll axis arm 11 includes a roll axis arm accommodation cavity 110. The first accommodation cavity 120 is connected to the roll axis arm accommodation cavity 110 for arranging conductive wires. As shown in FIG. 4, the second electromechanical coupling apparatus 22 includes a second hollow motor shaft 221. A second accommodation cavity 220 for wiring is arranged in the second hollow motor shaft 221. The pitch axis arm 21 includes a pitch axis arm accommodation cavity 210. The second accommodation cavity 220 is connected to the pitch axis arm accommodation cavity 210 for arranging wires. The roll axis component 1 further includes a first conductive wire 13 arranged in the first accommodation cavity 120 and the roll axis arm accommodation cavity 110. The pitch axis component 2 further includes a second conductive wire 23 arranged in the second accommodation cavity 220 and the pitch axis arm accommodation cavity 210. The first conductive wire 13 is electrically coupled to the second conductive wire 23, as shown in FIGS. 3 and 4.

In this embodiment, a first hollow motor shaft 121 and a second hollow motor shaft 221 are arranged in the first coupling apparatus 12 and the second coupling apparatus 22 of the three-axis gimbal 100, respectively. The first hollow motor shaft 121 and the second hollow motor shaft 221 accommodate the first conductive wire 13 and the second conductive wire 23. The first conductive wire 13 and the second conductive wire 23 pass through the first hollow motor shaft 121 and the second hollow motor shaft 221, respectively, without being arranged at the motor shaft in a wire winding manner. Thus, the wire winding space can be reduced, and the motor shaft thickness can be reduced. Arranging the first conductive wire 13 and the second conductive wire 23 in the shafts may make a gimbal bus relatively neat, and make assembling relatively simple.

As shown in FIG. 3, in one embodiment, the first electromechanical coupling apparatus 12 of the three-axis gimbal 100 includes a first connector 122 that is coupled to the first conductive wire 13. The first connector 122 can be externally coupled to other connectors, e.g., coupled to a connector at the TAG photographing apparatus or an intermediate connector arranged between the gimbal and the TAG photographing apparatus for controlling communication. The first conductive wire 13 is coupled to the first connector 122 through the first accommodation cavity 120 of the first hollow motor shaft 121. That is, the first conductive wire 13 passes through the first hollow motor shaft 121 along an axis line of the first accommodation cavity 120 for wiring, thereby making a relatively good use of space of the first hollow motor shaft 121. As the three-axis gimbal 100 rotates, the first conductive wire 13 does not rotate together with the rotation of the first hollow motor shaft 121. Accordingly, the first conductive wire 13 is prevented from loosening and tightening around the first hollow motor shaft 121, and correspondingly the first conductive wire 13 is prevented from being easily scratched for winding.

Figure 2:
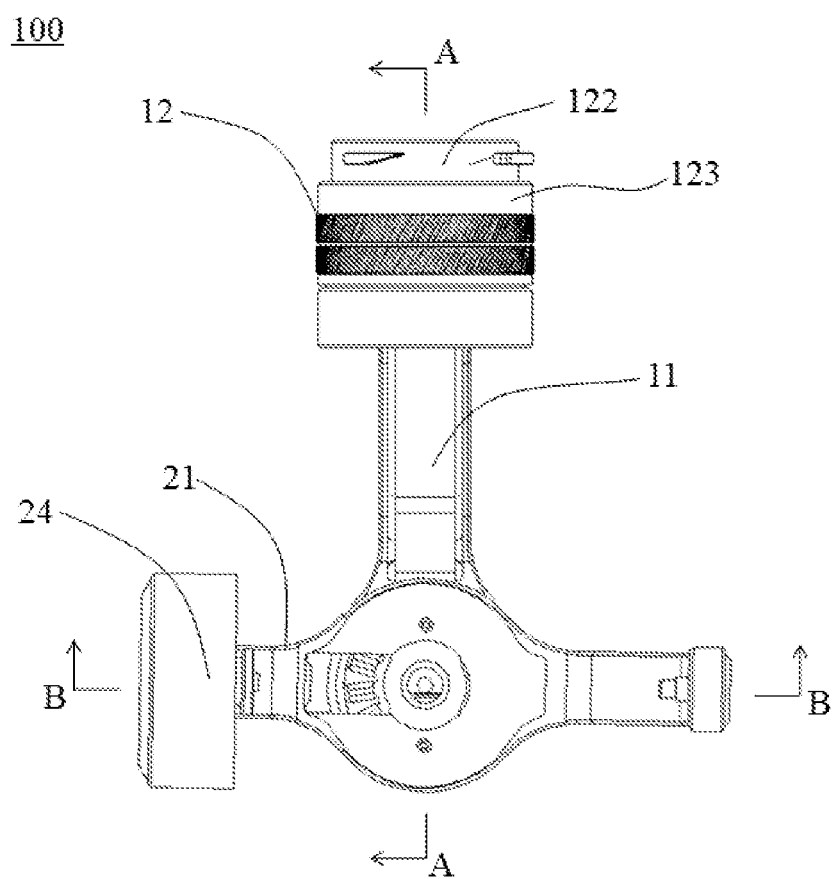
FIG. 2 is a front view of an exemplary three-axis gimbal according to disclosed embodiments of the present disclosure.

Further, as shown in FIGS. 2 and 3, the first electromechanical coupling apparatus 12 includes a first motor housing 123, and the first connector 122 is arranged at the first motor housing 123. The first conductive wire 13 is electrically coupled to the first connector 122. In some embodiments, the first motor housing 123 and the first hollow motor shaft 121 are integrally formed. In some embodiments, the first motor housing 123 and the first hollow motor shaft 121 may be welded to each other or coupled to each other securely in other manners. The first connector 122 includes a board-to-board connector. When the first connector 122 is coupled to an external connector of the TAG photographing apparatus, the first conductive wire 13 is used for transmitting interaction data of the first coupling apparatus 12 and the second coupling apparatus 22. A connection controller or an external connector may include a board-to-board connector matching with the first connector 122. The use of the board-to-board connector for the connection with the TAG photographing apparatus can ensure stability of high-speed data transmission of the three-axis gimbal 100 and the TAG photographing apparatus, and can improve operability of the TAG photographing apparatus.

Further, as shown in FIG. 4, the second electromechanical coupling apparatus 22 includes a second connector 223 coupled to the second conductive wire 23, and the second connector 223 is coupled to the photographing component 200. In some embodiments, an installation end 24 for mounting the photographing component 200 may be arranged at an end of the pitch axis arm 2 other than the end at which the second electromechanical coupling apparatus 22 is arranged. The second conductive wire 23 may extend from the installation end 24 and be coupled to the photographing component 200. A third electromechanical coupling apparatus (not shown) may be arranged at the installation end 24, for matching with the photographing component 200. In some embodiments, two installation ends 24 may be arranged on two sides of the second electromechanical coupling apparatus 22 and coupled to the photographing components 200, respectively.

The second conductive wire 23 may be coupled to the second connector 223 through the second hollow motor shaft 221. Thus, one end of the photographing component 200 may be coupled to the second connector 223 through the second conductive wire 23. The second connector 223 may be coupled to the first connector 122 through the first conductive wire 13, realizing a data transmission path between the photographing component 200 and the TAG photographing apparatus.

In the above embodiment, the first conductive wire 13 and second conductive wire 23 may be directly connected to each other. Alternatively, the first conductive wire 13 and the second conductive wire 23 may be integrally arranged. That is, the first conductive wire 13 and the second conductive wire 23 may be one conductive wire.

Further, as shown in FIG. 4, the second electromechanical coupling apparatus 22 includes a second motor housing 222. A second connector 223 may be arranged at the second motor housing 222. In some embodiments, the second motor housing 222 and the second hollow motor shaft 221 may be integrally formed. In some embodiments, the second motor housing 222 and the second hollow motor shaft 221 may also be welded to each other or coupled to each other securely in other manners. The second connector 223 may be fixedly arranged at the second motor housing 222. The first connector 122 may be arranged at the first motor housing 123. The first connector 123 and the second connector both may be fixedly arranged, and may be coupled to the external connector by plug-in or fixedly coupled to the external connector for data communication. Accordingly, an internal circuit may not be easily damaged. For example, the first conductive wire 13 and the second conductive wire 23 may be protected from being damaged.

As shown in FIG. 4, in some embodiments, the roll axis arm component 2 includes an intermediate connector (not shown) arranged at one end of the roll axis arm 11 that is coupled to the second electromechanical coupling apparatus 22. The intermediate connector is coupled to the first conductive wire 13. The intermediate connector is arranged between the first connector 122 and the second connector 223. Two ends of the first conductive wire 13 are coupled to the first connector 122 and the intermediate connector, respectively, and the intermediate connector is coupled to the second connector 223. In some embodiments, the second connector 223 and the intermediate connector include board-to-board connectors matching with each other. The first connector 122 is coupled to the intermediate connector through the first conductive wire 13. The intermediate connector matches with and is coupled to the second connector 223 for data transmission. The use of the board-to-board connector can ensure stability of high-speed data transmission of control portion of the three-axis gimbal 100 and the TAG photographing apparatus, and improve operability of the TAG photographing apparatus. The board-to-board connection of the intermediate connector and the second connector 223 is the same as or similar to the connection of the first connector 122 and the controller of the TAG photographing apparatus.

In an embodiment, the first conductive wire 13 and/or the second conductive wire 14 of the three-axis gimbal 100 may include coaxial wires. As shown in FIGS. 3 and 4, a portion of the coaxial wires arranged in the roll axis accommodation cavity 110 and/or the pitch axis accommodation cavity 210 may be tiled. That is, the first conductive wire 13 may be tiled in the roll axis accommodation cavity 110, and may be is arranged at a surface of axis arm in an axis arm section of the first roll axis arm 11. A portion of the second conductive wire 14 arranged in the pitch axis arm accommodation cavity 210 may be tiled, and may be arranged at a surface of axis arm in an axis arm section of the pitch axis arm 21. The portions in the first accommodation cavity 120 and/or the second accommodation cavity 220 may be dispersed and unpacked, and at a free status.

To summarize the foregoing description, conductive wires of the three-axis gimbal may be arranged in the electromechanical coupling apparatus and pass through axes, and may also be arranged in support arm of the gimbal. Accordingly, issues such as wire winding or wire scraping may be suppressed. Further, the structure can be relatively compact and reliable. The first connector and the second connector may include a board-to-board connector. The use of coaxial wires can overcome issues such as wire winding that may occur in a flexible printed circuit board, not only facilitating electrical connection, but also improving signal bandwidth and transmission rate of the gimbal.

The above description is only for the preferred embodiment of the present application, and is not intended to limit the present disclosure. Any modifications, equivalent substitutions, improvements, etc. made within the spirit and principles of the present disclosure are within the scope of the present disclosure.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A three-axis gimbal for mounting a photographing component, comprising: a roll axis component and a pitch axis component, wherein:
   the roll axis component includes a roll axis arm and a first electromechanical coupling apparatus arranged at one end of the roll axis arm;
   the pitch axis component includes a pitch axis arm and a second electromechanical coupling apparatus arranged at one end of the pitch axis arm;
   the first electromechanical coupling apparatus includes a first hollow motor shaft;
   a first accommodation cavity is arranged in the first hollow motor shaft;
   a roll axis arm accommodation cavity is arranged in the roll axis arm;
   the first accommodation cavity is connected to the roll axis arm accommodation cavity;
   the second electromechanical coupling apparatus includes a second hollow motor shaft;
   a second accommodation cavity is arranged in the second hollow motor shaft;
   a pitch axis arm accommodation cavity is arranged in the pitch axis arm;
   the second accommodation cavity is connected to the pitch axis arm accommodation cavity;
   the roll axis component further includes a first conductive wire in the first accommodation cavity and the roll axis arm accommodation cavity;
   the pitch axis component further includes a second conductive wire in the second accommodation cavity and the pitch axis arm accommodation cavity;
   the first conductive wire is connected to the second conductive wire; and
   the first conductive wire and/or the second conductive wire are coaxial wires, wherein:
      a first portion of the coaxial wire arranged in at least one of the roll axis arm accommodation cavity or the pitch axis arm accommodation cavity is tiled, and a second portion of the coaxial wire arranged in at least one of the first accommodation cavity or the second accommodation cavity is dispersed and unpacked.

2. The three-axis gimbal according to claim 1, wherein:
the first electromechanical coupling apparatus includes a first connector coupled to the first conductive wire, and
the first conductive wire is coupled to the first connector by passing through the first accommodation cavity of the first hollow motor shaft.

3. The three-axis gimbal according to claim 2, wherein:
the first electromechanical coupling apparatus includes a first motor housing, and
the first connector is arranged at the first motor housing.

4. The three-axis gimbal according to claim 3, wherein the first connector includes a board-to-board connector.

5. The three-axis gimbal according to claim 3, wherein the first motor housing and the first hollow motor shaft are integrally formed.

6. The three-axis gimbal according to claim 1, wherein:
the second electromechanical coupling apparatus includes a second connector coupled to the second conductive wire, and
the second conductive wire is coupled to the second connector by passing through the second hollow motor shaft.

7. The three-axis gimbal according to claim 6, wherein:
the second electromechanical coupling apparatus includes a second motor housing, and
the second connector is arranged at the second motor housing.

8. The three-axis gimbal according to claim 7, wherein the second motor housing and the second hollow motor shaft are integrally formed.

9. The three-axis gimbal according to claim 7, wherein:
the roll axis arm component includes an intermediate connector arranged at one end of the roll axis arm that is coupled to the second electromechanical coupling apparatus, the intermediate connector being coupled to the first conductive wire, and
the intermediate connector is coupled to the second connector.

10. The three-axis gimbal according to claim 9, wherein the second connector and the intermediate connector include board-to-board connectors matching to each other.

11. The three-axis gimbal according to claim 1, wherein the first conductive wire is directly connected to the second conductive wire.

12. The three-axis gimbal according to claim 1, wherein the first conductive wire and the second conductive wire are integrally formed.

13. The three-axis gimbal according to claim 1, wherein:
an installation end for mounting the photographing component is arranged at another end of the pitch axis arm that is other than the one end of the pitch axis arm at which the second electromechanical coupling apparatus is arranged, and
the second conductive wire extends from the installation end.

14. The three-axis gimbal according to claim 13, wherein a third electromechanical coupling apparatus is arranged at the installation end for matching with the photographing component.

15. A three-axis gimbal photographing apparatus, comprising:
a fuselage,
a photographing component, and
a three-axis gimbal between the fuselage and the photographing component, the three-axis gimbal including a roll axis component and a pitch axis component, wherein:
the roll axis component includes a roll axis arm and a first electromechanical coupling apparatus arranged at one end of the roll axis arm;
the pitch axis component includes a pitch axis arm and a second electromechanical coupling apparatus arranged at one end of the pitch axis arm;
the first electromechanical coupling apparatus includes a first hollow motor shaft;
a first accommodation cavity is arranged in the first hollow motor shaft;
a roll axis arm accommodation cavity is arranged in the roll axis arm;
the first accommodation cavity is connected to the roll axis arm accommodation cavity;
the second electromechanical coupling apparatus includes a second hollow motor shaft;
a second accommodation cavity is arranged in the second hollow motor shaft;
a pitch axis arm accommodation cavity is arranged in the pitch axis arm;
the second accommodation cavity is connected to the pitch axis arm accommodation cavity;
the roll axis component further includes a first conductive wire in the first accommodation cavity and the roll axis arm accommodation cavity;
the pitch axis component further includes a second conductive wire in the second accommodation cavity and the pitch axis arm accommodation cavity;
the first conductive wire is connected to the second conductive wire; and
the first conductive wire and/or the second conductive wire are coaxial wires, wherein:
a first portion of the coaxial wire arranged in at least one of the roll axis arm accommodation cavity or the pitch axis arm accommodation cavity is tiled, and
a second portion of the coaxial wire arranged in at least one of the first accommodation cavity or the second accommodation cavity is dispersed and unpacked.

16. The three-axis gimbal according to claim 15, wherein:
the first electromechanical coupling apparatus includes a first connector coupled to the first conductive wire, and
the first conductive wire is coupled to the first connector by passing through the first accommodation cavity of the first hollow motor shaft.

17. The three-axis gimbal according to claim 16, wherein:
the first electromechanical coupling apparatus includes a first motor housing, and
the first connector is arranged at the first motor housing.

18. The three-axis gimbal according to claim 17, wherein the first connector includes a board-to-board connector.

19. A three-axis gimbal for mounting a photographing component, comprising: a roll axis component and a pitch axis component, wherein:
the roll axis component includes a roll axis arm and a first electromechanical coupling apparatus arranged at one end of the roll axis arm;
the pitch axis component includes a pitch axis arm and a second electromechanical coupling apparatus arranged at one end of the pitch axis arm;
the first electromechanical coupling apparatus includes a first hollow motor shaft;

a first accommodation cavity is arranged in the first hollow motor shaft;
a roll axis arm accommodation cavity is arranged in the roll axis arm;
the first accommodation cavity is connected to the roll axis arm accommodation cavity;
the second electromechanical coupling apparatus includes a second hollow motor shaft and a connector;
a second accommodation cavity is arranged in the second hollow motor shaft;
a pitch axis arm accommodation cavity is arranged in the pitch axis arm;
the second accommodation cavity is connected to the pitch axis arm accommodation cavity;
the roll axis component further includes:
   a first conductive wire in the first accommodation cavity and the roll axis arm accommodation cavity; and
   an intermediate connector arranged at one end of the roll axis arm that is coupled to the second electromechanical coupling apparatus, the intermediate connector being coupled to the first conductive wire and the connector, respectively;
the pitch axis component further includes a second conductive wire in the second accommodation cavity and the pitch axis arm accommodation cavity, wherein the second conductive wire is coupled to the connector by passing through the second hollow motor shaft; and
the first conductive wire is connected to the second conductive wire.

* * * * *